May 24, 1960  E. ROFFMAN ET AL  2,938,163
DETECTION OF FAULTS IN MAGNETIC MATERIAL
Filed May 27, 1957  5 Sheets-Sheet 1

INVENTORS
EUGENE ROFFMAN &
ALFRED J. WYSOCZANSKI
BY W. E. Thibodeau, T. J. Lynch
& H. R. Johns

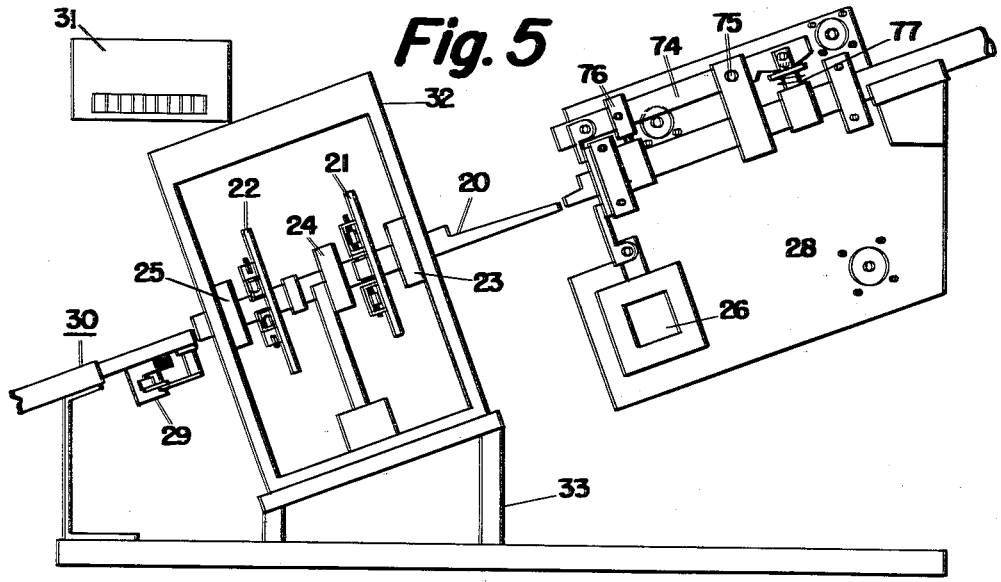
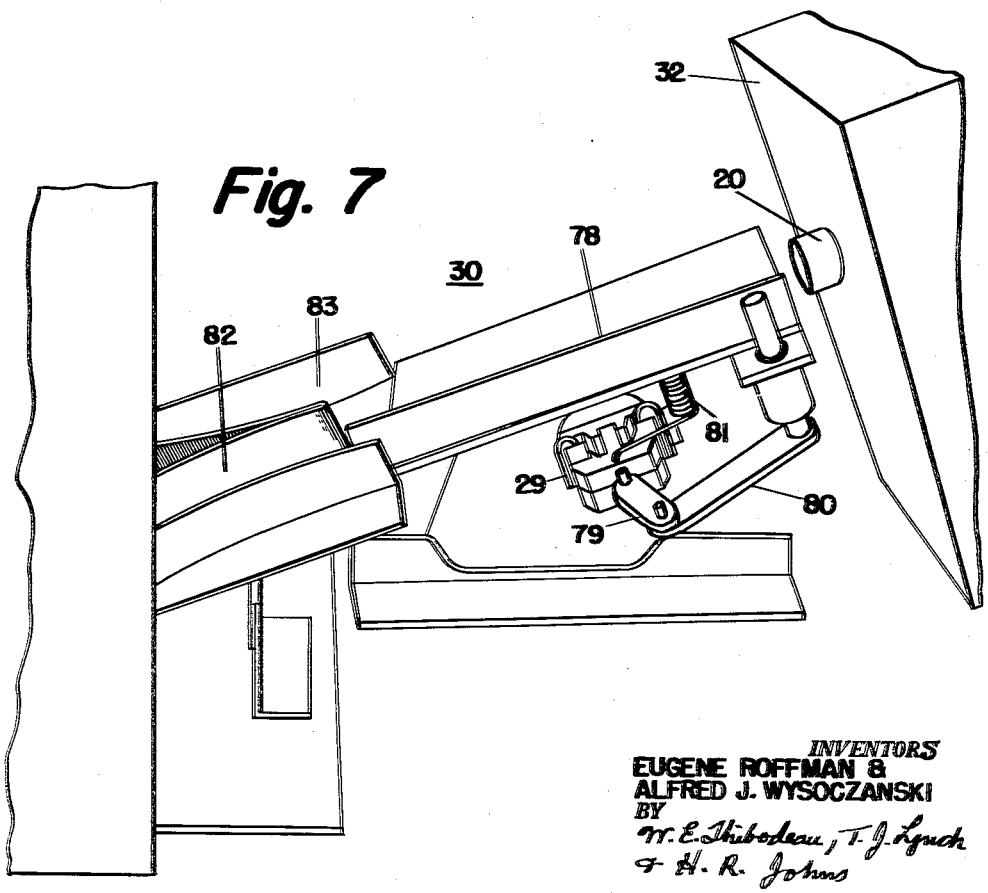

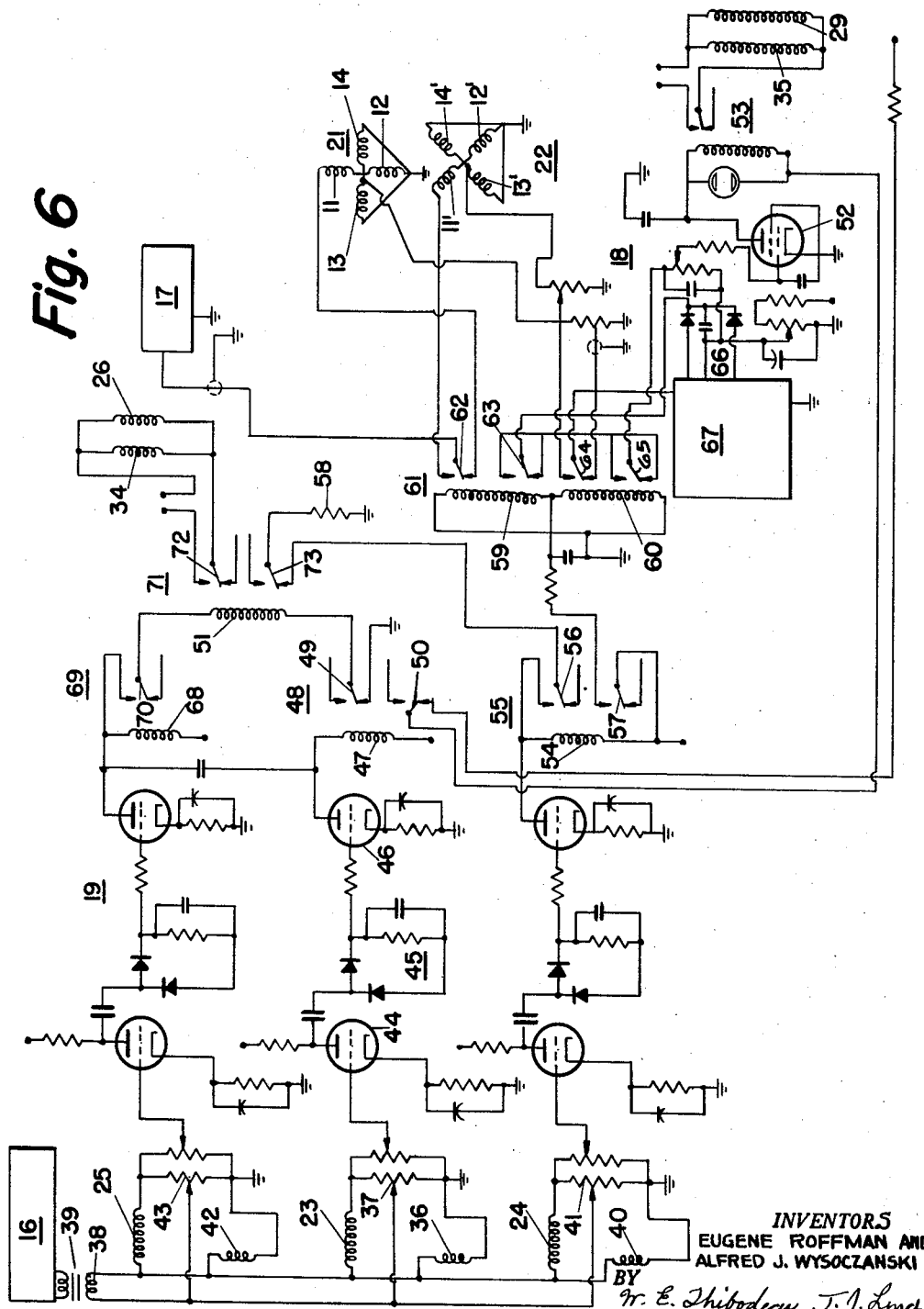

United States Patent Office 2,938,163
Patented May 24, 1960

2,938,163

DETECTION OF FAULTS IN MAGNETIC MATERIAL

Eugene Roffman and Alfred J. Wysoczanski, Philadelphia, Pa., assignors to the United States of America as represented by the Secretary of the Army Filed May 27, 1957, Ser. No. 661,976

2 Claims. (Cl. 324—37)

(Granted under Title 35, U.S. Code (1952), sec. 266)

The invention described herein may be manufactured and used by or for the Government for governmental purposes without the payment of any royalty thereon.

This invention relates to the detection of faults in magnetic materials and has for its principal object the provision of an improved fault detection apparatus and method of operation whereby cracks, splits, seams, laps and other such faults may be detected with greater accuracy and at greater speed than has been heretofore possible.

During the process of shaping shells or other objects made of steel or other magnetic materials, faults sometimes appear in the finished product. These faults are variously classified as cracks, splits, seams, laps and the like. All these faults are essentially structural breaks and are often so small as to be indetectable by the unaided eye.

Various methods of detecting these faults have been proposed in the past. Such methods are variously designated as the eddy current method, the radiographic method, the sonic method, or the magnetic method. Insofar as applicants are aware, however, none of these prior art methods have made it possible rapidly to detect faults in cylindrical objects such as 20 mm./APM95 shot for example. In accordance with our invention, such cylindrical objects may be tested with a high degree of accuracy at a speed of eighty or more per minute.

Our invention will be better understood from the following description considered in connection with the accompanying drawings and its scope will appear from the appended claims.

Referring to the drawings:

Fig. 1 is a block diagram indicating the essential elements at one of the test stations of our improved fault detector.

Figs. 2a, 2b, 2c and 2d differ from Fig. 1 in that they show how a crack with the tested specimen in one position may affect the various flux paths at one of the testing stations.

Fig. 5 indicates the physical arrangement of the various parts of the apparatus.

Fig. 6 illustrates the connections between different parts of the apparatus, certain of the various elements being shown in the form of blocks.

Fig. 7 shows the construction of the feed mechanism.

Figure 1:
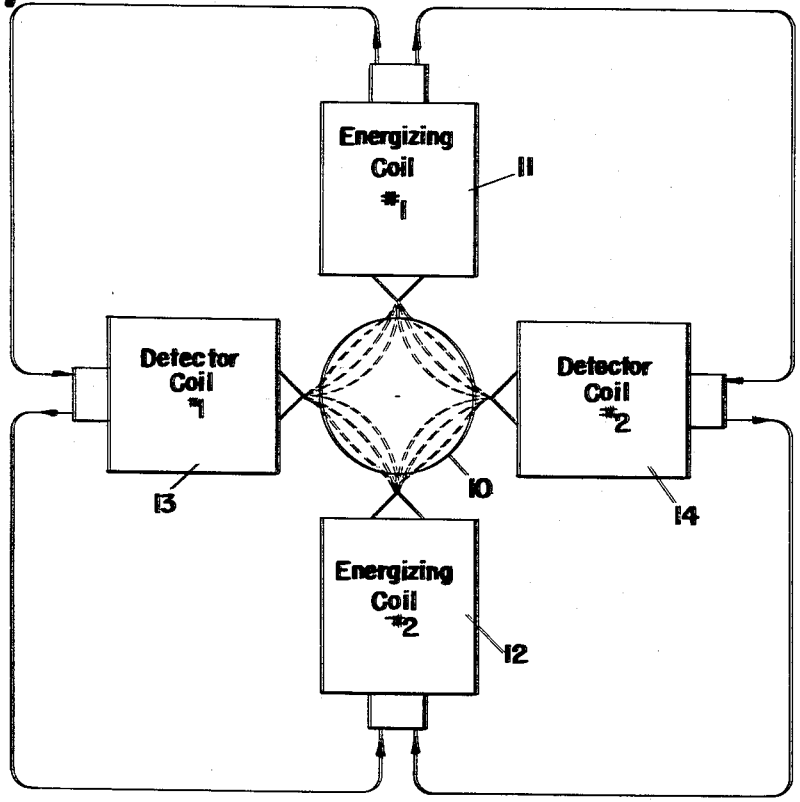

Fig. 1 shows a test specimen 10 which is positioned in the magnetic fields of opposed energizing coils 11 and 12. In the magnetic flux return paths of these two energizing coils are a pair of detector coils 13 and 14. It is assumed that the specimen 10 is perfect.

Under these conditions, the magnetic flux $\phi_1+\phi_2$ of the energizing coil 11 divides equally between the two detector coils 13 and 14 and has directions indicated by the arrow heads. Likewise the magnetic flux $\phi_3+\phi_4$ of the energizing coil 12 divides equally between the two detector coils 13 and 14 and has the directions noted by the arrow heads.

It will be noted, however, that the fluxes of the two energizing coils 11 and 12 traverse the two detector coils 13 and 14 in opposite directions. If therefore follows that anything which upsets this balanced condition of the various magnetic flux will produce in the affected detector coil a voltage which may be utilized to exert a control effect.

As hereinafter explained, applicants' fault detecting apparatus makes use of such a voltage to reject defective specimens.

As indicated in Figs. 2a, 2b, 2c and 2d, a fault located in any one of the four illustrated positions does not disturb the balanced magnetic loops and minimum voltage is induced in the detector coils 13 and 14.

Figure 3A:
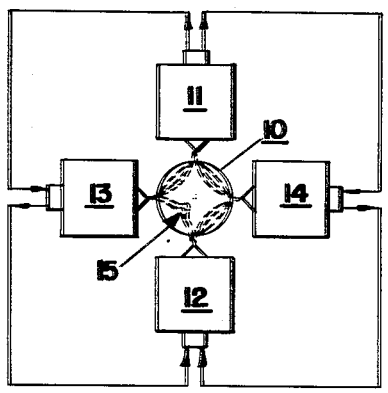
Figs. 3a, 3b, 3c and 3d show how a crack with the tested specimen in another position may affect the various flux paths at one of the testing stations.
Figure 3B:
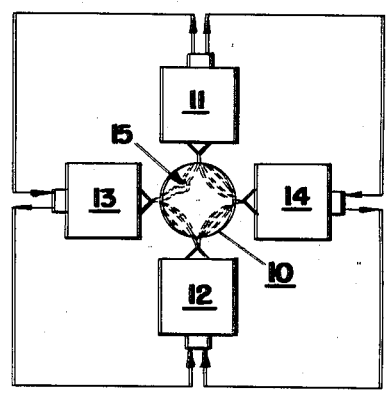
Figure 3C:
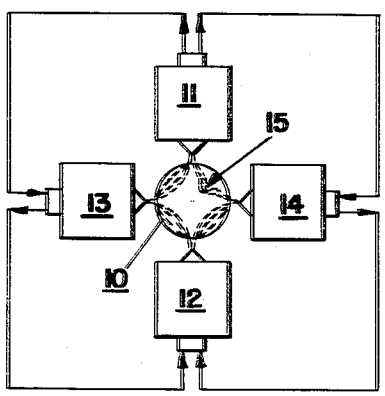
Figure 3D:
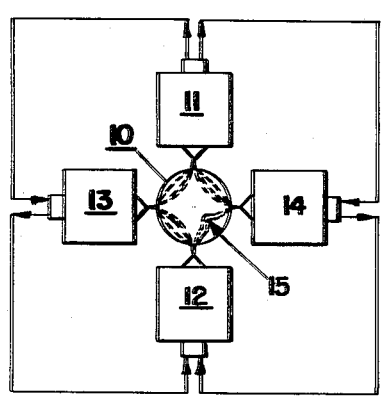

Figs. 3a, 3b, 3c and 3d show the fault 15 located in four different positions each of which is between an energizing coil and a detector coil. Thus Fig. 3a shows the fault 15 between the detector coil 13 and the energizing coil 12. With this position of the fault, $\phi_4$ is less than $\phi_1$ and $\phi_2$ is equal to $\phi_3$. Likewise, $\phi_4$ is greater than $\phi_1$ and $\phi_2$ is equal to $\phi_3$ when fault 15 is in the position indicated by Fig. 3b, $\phi_4$ is equal to $\phi_1$ and $\phi_2$ is less than $\phi_3$ when the fault is positioned as indicated by Fig. 3c, and $\phi_4$ is equal to $\phi_1$, and $\phi_2$ is greater than $\phi_3$ when the fault is positioned as indicated in Fig. 3d.

From these considerations it is seen that the four coil arrangement is not always effective to determine the presence of a fault when in alinement with any one of the poles.

As hereinafter explained, this difficulty is overcome by the provision of two units which are similar to that of Fig. 1, are spaced from one another along the axis of a feed tube through which the specimens to be tested are passed, and are angularly displaced about this axis with respect to one another.

Figure 4:
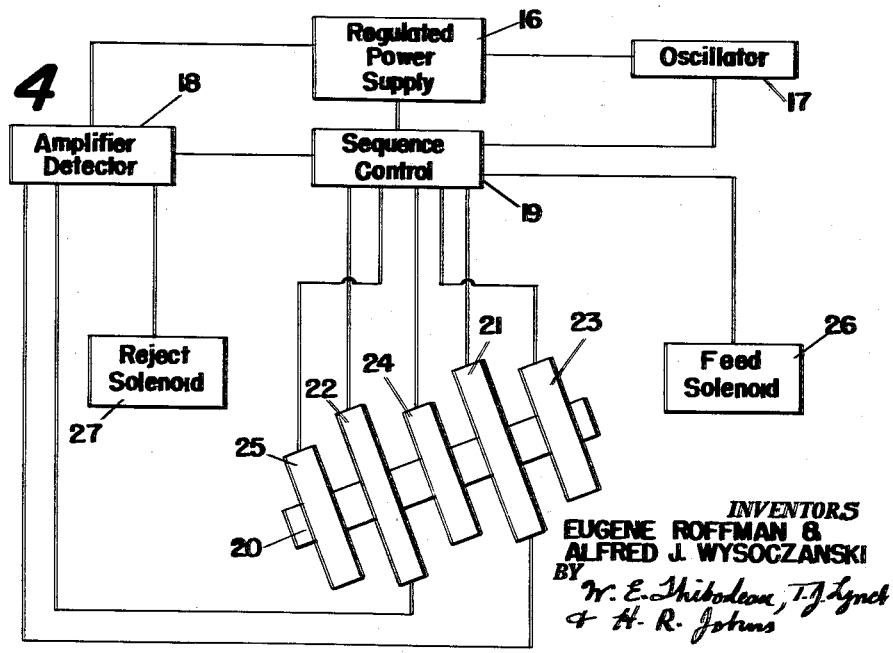
Fig. 4 is a block diagram indicating the construction of our improved fault detecting apparatus.
Figure 2A:
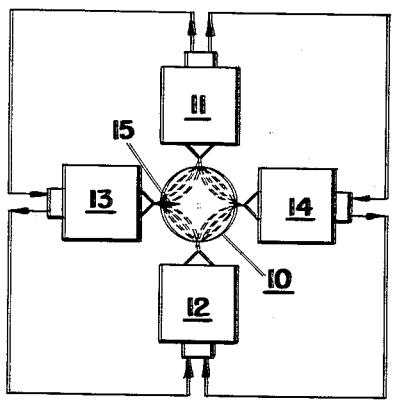
Figure 2B:
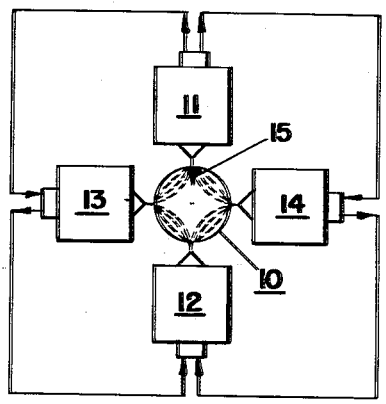
Figure 2C:
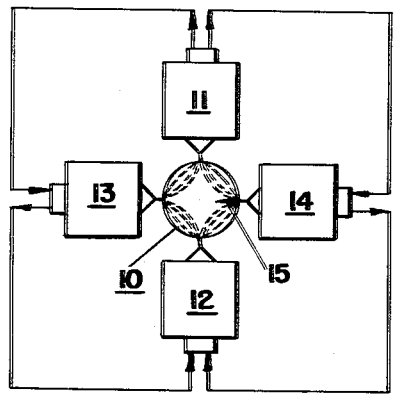
Figure 2D:
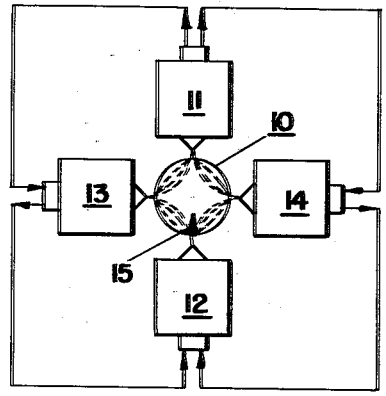

Fig. 4 indicates in a general way the relation between the various parts of applicants' fault detector. Eenergized from a regulated power supply 16 are an oscillator 17, an amplifier-detector 18 and a sequence control circuit 19. Centered about a specimen feed tube 20 are the pair of angularly displaced and longitudinally displaced test units mentioned above, these units being indicated by the reference numerals 21 and 22. Also centered about the tube 20 are three sequence coils 23, 24 and 25. These sequence coils are energized from the source 16 and function to effect successive switching operations as a test specimen progresses through the feed tube 20. Thus, as hereinafter explained in greater detail, the sequence coil 23 effects resetting of a specimen reject element and clearing of the sequence circuitry, the sequence coil 24 effects switching of energy from the test station 21 to the test station 22, and the sequence coil 25 effects actuation of a solenoid 26 which releases the test specimens so that they may slide down the slanted feed tube 20.

When a defective test specimen slides down the tube 20, a voltage is produced at test station 21 or test station 22 as explained above. This voltage is applied to the input circuit of the amplifier-detector 18 which has its output connected to a reject solenoid 27. This solenoid 27 is a part of an accept-reject mechanism by which the tested perfect and imperfect specimens are separated from one another.

Fig. 5 indicates more clearly the structural details of our fault detector. In this figure, the specimen feed tube is indicated by the reference numeral 20, the sequence coils by the reference numerals 23, 24 and 25 and the test stations by the reference numerals 21 and 22. A specimen feed mechanism is indicated by reference numeral 28, a specimen reject mechanism by numeral 29, the accept and reject chutes by numeral 30, and a counter by numeral 31. The electrical connections of these various elements are indicated in the wiring diagram of Fig. 6.

It will be noted that the sequence coils 23, 24 and 25 and the coils of the test stations 21 and 22 are positioned within a magnetic shield 32 and mounted on a support 33. The high sensitivity of a 4-coil test station to electromagnetic fields originating from nearby power sources necessitates the thorough shielding of the test stations. The electromagnetic fields developed by the energizing coils of each test station induce relatively large voltages in the detector coils of the adjacent test station. Therefore, a switching circuit is employed to eliminate the undesirable effects of coupling between stations. As indicated above, this circuit switches the energizing voltage from the first to the second station as the specimen passes down the feed tube 20.

The feed tube 20 is replaceable and is made of synthetic resin. This type of feed tube was finally selected after trial of a chrome-plated brass tube and a glass tube.

With the brass tube, difficulty was encountered in positioning and balancing the test stations. Investigation revealed that a variation in the wall thickness of the tube resulted in non-uniform eddy currents in portions of the feed tube. This condition seriously affected the electrical balance of the test station. Also, since wall thickness variations differed in available chrome-plated brass feed tubes, it was impossible to rotate or replace the feed tubes without altering the test station balance. In order to eliminate the unbalance effect of eddy currents, a single length of replaceable glass tube was substituted for the chrome-plate brass tube. Use of this tube, however, showed that abrasive particles and burrs on the specimens tested eventually caused the glass feed tube to crack. The test station assembly was then modified to permit use of a replaceable synthetic resin feed tube. Such tubes are usually electrically non-conductive and also non-magnetic. This tube proved to be satisfactory mechanically.

Fig. 6 is a wiring diagram wherein elements shown in previous figures are indicated by the same reference numerals. Thus the numeral 16 indicates the power source, the numeral 17 indicates the oscillator, the numeral 19 indicates the sequence control circuits, the numeral 18 indicates the amplifier-detector, the numerals 23, 24 and 25 indicate the sequence coils, the numerals 21 and 22 indicate the angularly displaced test stations, the numeral 26 indicates the solenoid of the specimen feed mechanism, and the numeral 29 indicates the solenoid of the accept-reject mechanism. It should be noted that a solenoid 34 connected in parallel with the feed solenoid 26 is utilized to actuate one of the two mechanical counters indicated at 31 in Fig. 5 and that a solenoid 35 connected in parallel with the reject solenoid is utilized to actuate the other of the counters shown at 31 in Fig. 5.

Detailed operation of applicants' fault detection will now be explained with reference to Fig. 6 which shows all the essential elements with the exception of the feed and reject mechanisms 28 and 29 (see Fig. 5), these mechanisms being more particularly shown in Fig. 7.

It will be noted from Fig. 6 that the sequence coil 23 is interconnected with a balancing coil 36 and a resistor 37 to form a balanced bridge circuit which is energized from a 6.3 volt-1.2 ampere secondary winding 38 of an input transformer 39. Similarly, the sequence coil 24 is interconnected with a balancing coil 40 and a resistor 41, and sequence coil 25 is interconnected with a balancing coil 42 and a resistor 43. Under these conditions no control pulse is produced until a specimen to be tested passes through the sequence coil 23. The first of such pulses may be produced by the travel of a specimen which is released from the feed mechanism as hereinafter explained in connection with Fig. 7. After this starting pulse, operation of the fault detector is automatic.

Assuming that a specimen has just traversed the last sequence coil 25, the movable contact 70 of a relay 69 is in its upper position, the operating coil 51 of a relay 71 is energized so that its contacts 72 and 73 are in their upper positions, and the contacts of the relays 48, 55 and 61 are in their illustrated positions.

Under these conditions, the feed solenoid 26 is energized so that its contacts 72 and 73 are in their upper positions, and the contacts of the relays 48, 55 and 61 are in their illustrated positions.

Under these conditions, the feed solenoid 26 is energized, the energizing coils 11 and 12 of the test station 21 are connected to the oscillator 17, and the detector coils 13 and 14 are connected to the input of the amplifier 67.

If a specimen now passes through the first sequence coil 23, there is produced a transistory pulse which is transmitted through an amplifier 44, a voltage doubler circuit 45, and an amplifier 46 to the operating coil 47 of a relay 48. Energization of the coil 47 actuates movable contacts 49 and 50 to their upper positions. In this position, the contact 49 open-circuits the relay coil 51 to clear the sequence circuitry, and the contact 50 opens the anode circuit of a gas tube 52 so that it is deenergized and in condition to operate through a relay 53 to energize the reject solenoid 29 and the reject counter operating coil in response to a control pulse transmitted from a detector coil 13 or 14 of the test station 21.

Leaving the test station 21, the specimen now traverses the sequence coil 24, producing a pulse which is transmitted through its output channel to the operating coil 54 of a relay 55. As a result, the movable contacts 56 and 57 are moved to their upper positions. Closure of the contact 56 connects the upper terminal of the coil 54 to ground through a resistor 58 so that the contacts 56 and 57 are held in their upper positions. Closure of the contact 57 energizes the operating coils 59 and 60 of a relay 61 and its movable contacts 62, 63, 64 and 65 are moved to their upper positions. In this position, the contacts 63 and 65 complete the output circuit of the detector 66, the contact 62 connects the energizing coils 11$^1$ and 12$^1$ of the test station 22 to the output of the oscillator 17, and the contact 64 connects the detector coils 13$^1$ and 14$^1$ of the test station 22 to the input of the amplifier 67 which has its output connected to the detector 66. With these connections, passage of a defective specimen through test station 22 produces a pulse which is transmitted through the amplifier 67 and detector 66 to the reject solenoid 29 and the operating coil 35 of the reject counter.

Passage of a specimen from the test station 22 through the sequence coil 25 produces a pulse which is transmitted through its output channel to the operating coil 68 of the relay 69, and the contact 70 is moved to its upper position. With this connection, the relay coil 51 is maintained in an energized condition, the contact 49 of the relay 48 having returned to its lower position after the transient pulse which was delivered from the sequence coil 23 for clearing the sequence circuitry.

Since the coil 51 is now energized, the contact 72 and 73 are in their upper positions, the contact 72 completing the circuits of the feed solenoid 26 and the operating coil 34 of the feed counter, and the contact 73 breaking the holding circuit of the relay 55 so that the contacts 56 and 57 move to their lower positions. This deenergizes the relay 61 and its contacts are moved to their lower position.

In this position, the contact 62 connects the oscillator 17 to the energizing coils 11 and 12 of the test station 22, the contact 64 connects the detectors 13 and 14 of test station 22 to the input.

It is thus seen that passage of a specimen through the last sequence coil 25 leaves the feed solenoid energized so that a test specimen is started down the tube 20. At the same time the test station 21 is connected in the circuit so as to respond to the passage of the specimen through it.

Passage of the specimen through the sequence coil resets the circuit by deenergizing the feed solenoid 26 and the gas tube 52.

The specimen is tested as it passes through the station 21 to the sequence coil 24.

In response to the passage of the specimen through the sequence coil 24 a holding circuit is completed for the relay 55 and at the same time the circuit is switched from test station 21 to test station 22. This completes the cycle of operation, the passage of the specimen through the sequence coil 25 again energizing the feed solenoid for releasing another specimen.

The structural details of the specimen feed mechanism are indicated in Fig. 5 wherein the feed solenoid 26 is shown as coupled to a rocker arm 74 which is pivoted at 75, is provided at its left hand end with a support 76 from which a stop-pin extends down into the feed chute, and is biased by a spring 77 to a downward position for stopping travel of a specimen through the feed chute until the solenoid 26 is energized to raise the stop-pin.

The accept-reject mechanism is shown in Fig. 7 as including the reject solenoid 27 which is mechanically coupled to a trough 78 through links 79 and 80. The trough 78 is biased by a spring 81 to an accept chute 82 and is shifted to a reject chute 83 when the reject solenoid is energized.

The improvement effected by applicants' improved fault detector is indicated by field tests made on fifty thousand 20 mm. shot. These shot were first tested in the production line of a shot manufacturer with a magnetic particle equipment. The results indicated 48,500 acceptable shot and 1500 rejected shot.

A test of the 48,500 acceptable shot with applicants' test detector indicated 250 rejects. A careful retest of these rejects by the magnetic particle equipment indicated that all but 7 contained cracks. However, when retested by applicants' detector, the 7 shot were again rejected. Although flaws were not visible during magnetic particle inspection, visual examination after destructive testing revealed flaws.

Tests made with applicants' detector on the lot of 1500 rejects revealed 200 acceptable. These acceptable shot were then carefully retested with the magnetic particle inspection equipment. These tests indicate that only 20 of the shot were defective.

We claim:

1. In a device for detecting faults in magnetic objects, the combination of a non-magnetic electrically non-conductive means for defining a path of travel for an object, a source of pulsating current, and a ring shaped test station surrounding said non-magnetic means, said test station consisting of two energizing coils and two detector coils, said detector coils being coaxially displaced and disposed on opposite sides of said non-magnetic means, said energizing coils being electrically connected to said current source and to said detector coils and arranged with said non-magnetic means between them in such a position that flux from said energizing coils is equally divided through a test object, whereby the induced current in each detector coil produces a resultant voltage equal to zero only in the absence of a fault in the test object.

2. In a device according to claim 1, a second test station similar to the first test station displaced from said first test station along said non-magnetic means for defining a path of travel for an object and angularly rotated with respect to said first test station.

References Cited in the file of this patent

UNITED STATES PATENTS

| | | |
|---|---|---|
| 939,109 | Switzer | Nov. 2, 1909 |
| 2,065,118 | Davis | Dec. 22, 1936 |
| 2,345,091 | Brace | Mar. 28, 1944 |

FOREIGN PATENTS

| | | |
|---|---|---|
| 641,674 | Great Britain | Aug. 16, 1950 |